(No Model.)

E. EARLEY.
MACHINE FOR SPOOLING WIRE.

No. 389,555.　　　　　　　　Patented Sept. 18, 1888.

Witnesses
Jos. A. Ryan
J. W. Gardner

Inventor
Edward Earley

By his Attorneys
C. A. Knowles

UNITED STATES PATENT OFFICE.

EDWARD EARLEY, OF SCANDIA, KANSAS.

MACHINE FOR SPOOLING WIRE.

SPECIFICATION forming part of Letters Patent No. 389,555, dated September 18, 1888.

Application filed June 5, 1888. Serial No. 276,140. (No model.)

*To all whom it may concern:*

Be it known that I, EDWARD EARLEY, a citizen of the United States, residing at Scandia, in the county of Republic and State of Kansas, have invented a new and useful Improvement in Machines for Spooling Wire, of which the following is a specification.

My invention relates to an improvement in machines for reeling and unreeling wire; and it consists in the peculiar construction and combination of devices that will be more fully set forth hereinafter, and particularly pointed out in the claims.

The object of my invention is to provide a machine which is adapted to be attached to a wagon, and by means of which wire that has been taken from a fence may be reeled up into a compact bundle, so as to facilitate handling the wire.

Figure 1:
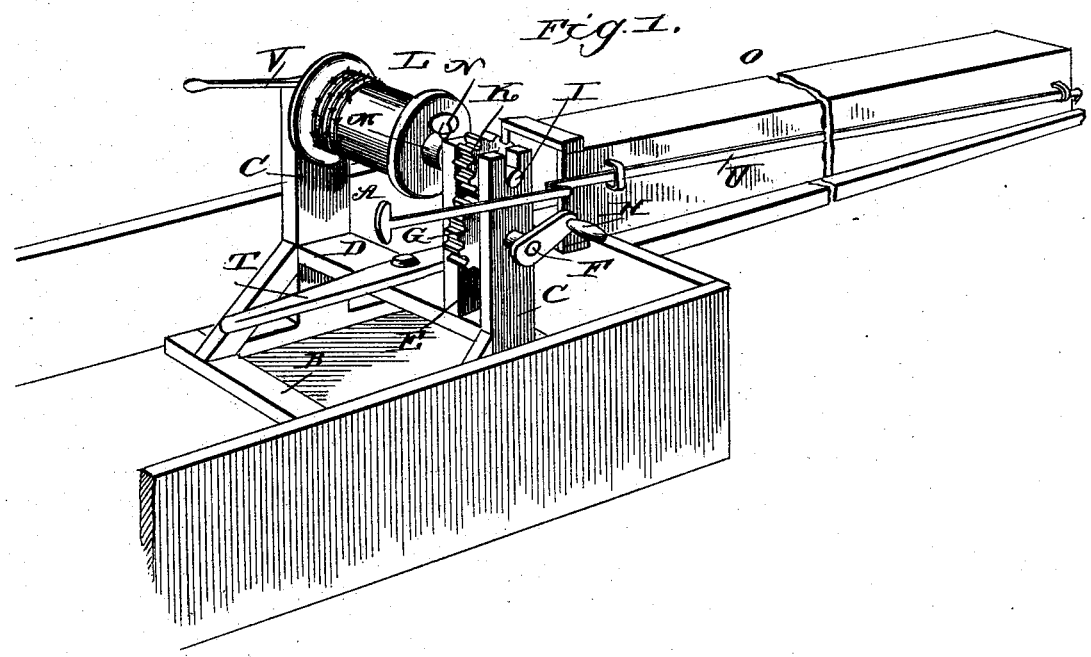
Figure 2:
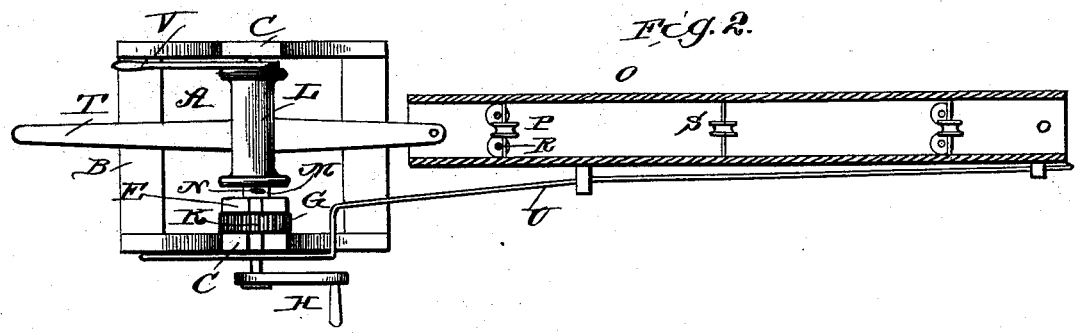

In the accompanying drawings, Figure 1 is a perspective view of a wire-reeling machine embodying my improvements, showing the same arranged in a wagon-bed. Fig. 2 is a top plan view of the same, partly in section.

A represents a frame which has a supporting-base, B, and is provided with a pair of vertical standards, C, which are arranged at a suitable distance apart. A horizontal beam, D, connects the said standards at a suitable distance from the base-frame, and a standard, E, extends upward from the said beam and is arranged on the inner side of and in proximity to one of the standards C.

F represents a shaft which is journaled in bearings in the standard E and the proximate standard C, and said shaft has a spur-wheel, G, and a crank, H.

I represents a shaft which is journaled in vertical open slots in the upper ends of the standards C E, and has a pinion, K, which meshes with the wheel G. A spool or reel, L, such as is commonly employed for reeling wire, is arranged on the shaft I, and is secured thereto and caused to rotate therewith by means of collars M, arranged on the shaft, and having set-screws N, by means of which they may be secured to the shaft and to the spool or reel.

From the foregoing description it will be understood that the spool or reel may be rotated by turning the crank H.

O represents a guiding-trough of suitable length, which has its outer end loosely connected to the outer end of the tongue of the vehicle, and has its inner end loosely mounted on the front end of the wagon box or bed. At the outer and inner ends of the said trough are guiding anti-friction rollers P, which are arranged in pairs and are journaled on vertical and horizontal rods R, that extend across the throat of the guiding-trough and are arranged at right angles to each other, as shown. The said anti-friction rollers may be either cylindrical or concave, and, being arranged in pairs at right angles to each other, form guides, through which the wire may be directed to the spool or reel, as will be readily understood. Midway between the ends of the trough is arranged a yoke, thimble, or tunnel, S, which also serves as a guide for the wire.

T represents a lever which is pivoted on the beam B, and has its outer end pivotally connected to the inner end of the guide-trough O.

The operation of my invention is as follows: After the wire has been taken from the fence and laid on the ground, one end of the wire is passed through the guiding-trough and is attached to the reel or spool. The horses attached to the wagon are then driven in line with the wire, and a person stationed in the wagon grasps the crank H with one hand and rotates the same so as to cause the spool or reel to take up the wire as fast as the wagon advances, and with his other hand he manipulates the lever T so as to move the rear end of the guiding-trough laterally, and thereby cause the same to deliver the wire evenly to all parts of the reel or spool and cause the wire to be compactly coiled thereon. A rod, U, is guided in eyes or keepers on one side of the trough and has a clip at its outer end, and when it becomes necessary to cut the wire, when the reel or spool has been filled, the same is accomplished by drawing upon the rod. The device is also adapted to be used for paying out wire, as will be readily understood, and a brake-lever, V, is provided, which is adapted to bear against one end of the reel or spool, so as to regulate the speed with which the same rotates.

Having thus described my invention, I claim—

1. The combination of the reel, the feed-trough having the friction-rollers arranged at right angles to each other, for the purpose set forth, and the lever connected to the inner end of the trough to operate the same, substantially as described.

2. The combination, with the wagon, of the frame mounted therein and having the revoluble shaft adapted to carry the reel or spool, the trough having its outer end pivotally connected to the outer end of the tongue and its inner end resting on the wagon-body, and the lever fulcrumed to the frame and connected to the trough, for the purpose set forth, substantially as described.

3. The combination of the portable frame having the cross-beam D and the standards C E, the shaft I, mounted in the proximate standards C E and having the spur-wheel K, the crank-shaft F, mounted in the same standards and having the wheel G, engaging wheel K, the reel journaled in one standard, C, and having one end detachably secured to shaft I, with the lever T, fulcrumed on the beam D, and the trough having its outer end pivotally connected to a suitable support and its inner end laterally movable and connected to the lever T, substantially as described.

In testimony that I claim the foregoing as my own I have hereto affixed my signature in presence of two witnesses.

EDWARD EARLEY.

Witnesses:
A. D. WILSON,
J. N. LOOFBOURROW.